P. BRANDT.
HYDRAULIC PRESS.
APPLICATION FILED SEPT. 14, 1908.
967,166.
Patented Aug. 16, 1910.
3 SHEETS—SHEET 3.
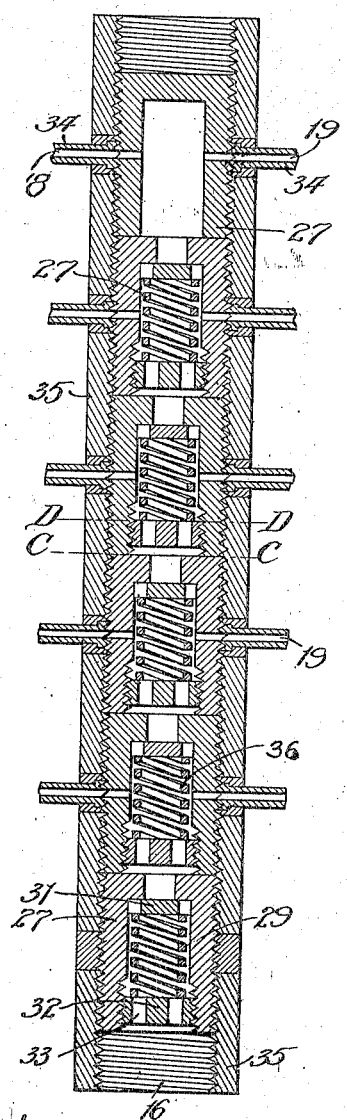
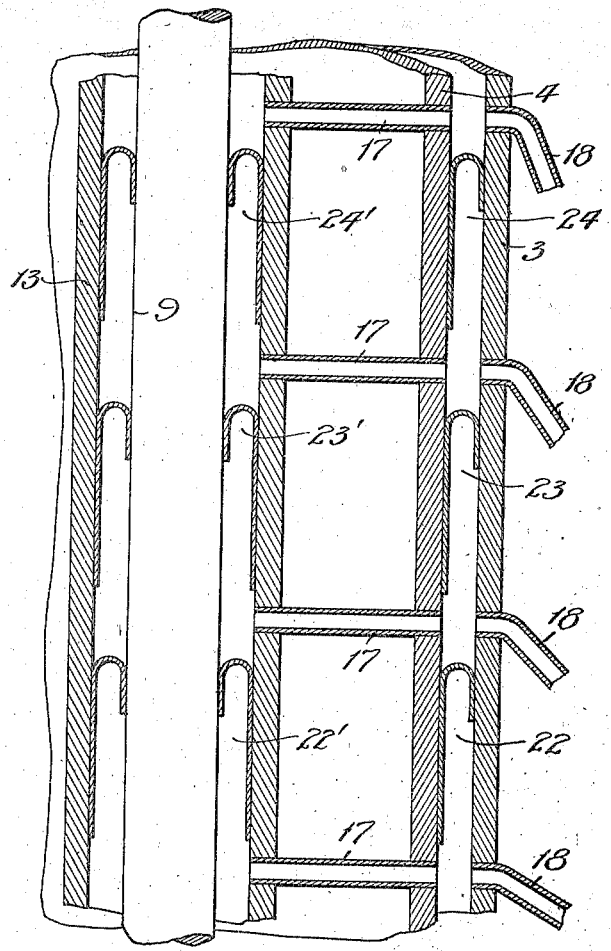

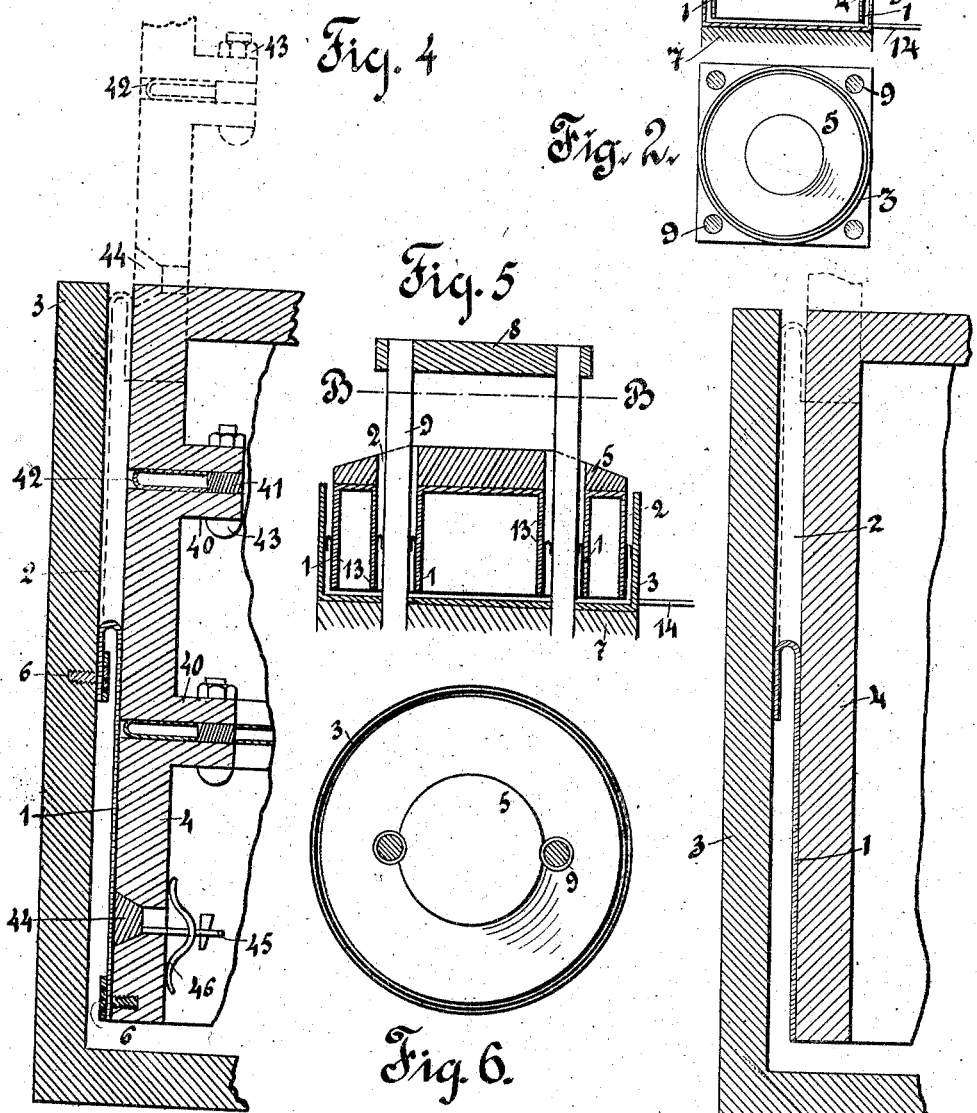

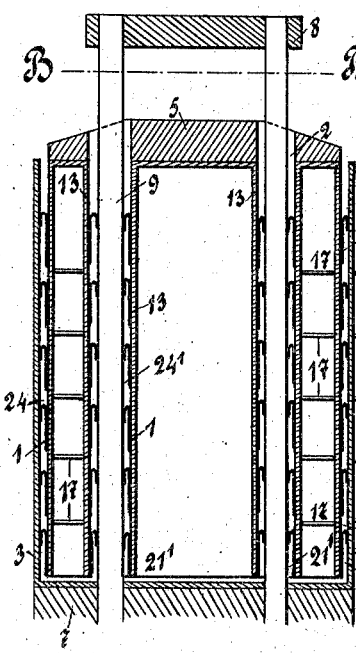

UNITED STATES PATENT OFFICE.

PIERRE BRANDT, OF ST. PETERSBURG, RUSSIA.

HYDRAULIC PRESS.

967,166.

Specification of Letters Patent.  Patented Aug. 16, 1910.

Application filed September 14, 1908. Serial No. 453,020.

*To all whom it may concern:*

Be it known that I, PIERRE BRANDT, a subject of the Emperor of Russia, of 5 Officer street, St. Petersburg, Russia, engineer and professor, have invented new and useful Improvements in Hydraulic Presses, of which the following is a specification.

My invention relates to hydraulic and pneumatic apparatus and to packing therefor, and it has for its main object to provide improved packings for making as far as possible a fluid tight joint between parts having a relative to-and-fro motion.

The improved packings are intended to be employed as substitutes for plunger and piston rings, stuffing boxes for piston rods, hydraulic seals for gasholders and gas meters, sliding cup and other leather packings in hydraulic and pneumatic presses and lifts and the like.

Notwithstanding later improvements, the Brahma press for high pressures (hundreds of atmospheres) with the usual type of packing does not allow for technical reasons, of the use of solid plungers of large diameters, while it is not advisable to use hollow plungers of large diameters because owing to the great pressures, the walls of such plungers become distorted transversely so that the plunger is liable to get jammed in the leather packed stuffing box.

Now packings constructed according to this invention enable hollow plungers of very large diameters to be used with very high pressures, and they also render an accurate machining of the movable parts unnecessary.

The accompanying diagrammatic drawings illustrate by way of example several forms of this invention.

Figure 1 is an axial section of a hydraulic press constructed according to this invention; Fig. 2 is a horizontal section on the line A—A of Fig. 1; Figs. 3 and 4 are axial sections through the walls of the cylinders and plungers of two forms of the press; Figs. 5 and 7 are axial sections of two further forms of the press; Fig. 6 is a horizontal section on the line B—B of Figs. 5 and 7; Figs. 8 and 11 are axial sections of the pressure distributing or regulating device; Figs. 9 and 10 are horizontal sections on the lines C—C and D—D of Figs. 8 and 11; Fig. 12 is an axial section, similar to Fig. 7, but on a larger scale.

The essence of the invention consists in forming a fluid-tight joint by means of a sleeve or collar 1 which rolls on itself (but does not slide) with the motion of the parts to be jointed. This rolling collar is composed of an elastic and as impervious as possible material, such as for instance, woven fabric, covered or combined with rubber. One end of this collar is attached to the fixed part (the cylinder 3) 3, and the other end is attached to the movable part (the plunger) 4, of the apparatus. In most cases a sufficient attachment will be produced by fastening the collar by sticking but bolts 6 (Fig. 4) and washers may also be used to strengthen the attachment.

During the operation of the apparatus the apex or top of the collar moves away from one part and adapts itself to the other part of the apparatus without sliding, and without appreciable friction, as indicated in Figs. 3 and 4 in which the movable parts are drawn in their lowest positions in full lines and in their highest positions in dotted lines.

The width of the annular space 2, in which the rolling collar 1 works, is three to ten times the thickness of the material of the collar and depends on the pliability of this material and on the amount of deformation of the diameters of the apparatus produced by the variations of pressure.

The rolling collar is applicable not only to cylindrical apparatus, but also to apparatus of prismatic form. In the latter case as well as where there is a considerable difference between the extreme radii of curvature of the space 2 (as is the case with cylinders and piston rods of small dimensions), the rolling collar is preferably made of rubber covered woven fabric composed wholly of warp threads without weft threads, for the purpose of rendering it capable of stretching and more elastic in one direction and more strong in the other direction.

In presses constructed according to this invention the columns 9, connecting the base plate 7 to the top plate 8 need not necessarily be located outside of the press cylinder, but may be arranged inside the latter (Figs. 5, 6 and 7) in which case they pass through the platform 5 of the press. The columns 9 are surrounded by sleeves 13 provided on the piston 4. Rolling collars are also arranged between the sleeves 13 and the columns 9.

Figs. 6 and 7 illustrate a hydraulic press in which the pressure can be increased to almost six times the pressure which can be borne by a single rolling collar. This is rendered possible by employing a number of rolling collars (six), arranged in stages above one another whereby each collar is subjected only to a pressure equal to the difference between the pressures existing in the spaces situated on the two sides of the said collar, so that all the collars together take the sum of all these differences, that is to say, the full working pressure of the operative pressure fluid in the cylinder 3, which is supplied through pipe 14. The distance between the rolling collars must be such as to allow each collar to stretch or roll to its full extent along the surface of the cylinder and piston without overlapping the next collar situated above it.

The pressure is distributed uniformly to the chambers 21, 22, 23 by means of the pressure-distributers 15 (Figs. 8, 9, 10). Pressure regulators 16 (Figs. 9, 10, 11 are provided for the purpose of preventing irregular deformations of the rolling collars 1.

The chambers 21', 22' (around the columns 9) are connected with the chambers 21, 22 by means of small pipes 17, and the chambers 21, 22 with the pressure distributers 15 and pressure regulators 16 by means of pipe 18. Tubular connectors 19 are provided for the attachment thereto of pressure manometers that allow to control the operation of the apparatus The pressure distributers and the pressure regulators consist of a number of valve casings 27 arranged above one another containing valve 30, 31 acted upon by springs 28, 29, with adjusting screw disks 32. The latter have holes 33 for engagement with a spanner and for passage of the pressure fluid.

The valves 30 of the pressure distributer open upward and the valves 31 of the pressure regulator open downwardly, but this is not essential.

The connecting pipes 18, 19 are inserted in the nipples 34 and the several casings 27 are screwed up together, each forming a unit 15 or 16, by means of sleeves 35, which also serve for connecting the device to the supply pipe and the like.

By reference to Figs. 7, 8 and 11 it will be noted that the operation of the device is about the following: The fluid enters the lowest casing of the regulator 16 and the chambers 21, 21' through pipe 14. The lowest valve of the distributer 15 is closed and will only be opened after the pressure has exceeded a certain limit, the valve 30 then being pressed upwardly. The pressure fluid thereby enters the lowest valve casing of the distributer and from there it is conveyed through pipe 18 into the chambers superposed to chambers 21, 21'. Simultaneously pressure fluid flows from the lowest distributer casing into the second regulator casing, and it may be seen that the fluid in the second regulator casing 36 will force open the subjacent casing when the pressure in the second casing exceeds a certain limit. By the afore described connections and valves the pressure fluid is successively admitted into the superposed chambers in the interspace between piston and cylinder, the valves of the distributer being actuated, when the expansion of the rolling packing has reached its limit. The valves of the regulator are actuated by overpressure in one of the distributing valves and therefore hold the pressure uniform in all of said chambers.

It is obvious that it is of advantage to have comparatively strong springs in the distributer, so that the packing tubing may be strained to its limit of safety, and that on the contrary it will be of advantage to have weaker springs in the regulator. The regulator will then enter into operation immediately when the pressure in one chamber is higher than the pressure in another one.

From the foregoing it is clear that if a limit is to be placed on the pressures that can be employed in apparatus constructed according to this invention, such limit is determined not by the number of chambers (rolling collars) arranged above another, but by the strength of the metals and the speed of diffusion of the liquids and gases.

In the construction shown in Figs. 5 to 7, the vertical piston walls 4 are subjected to pressure stresses and the packing collars 1 are subjected to tensile stresses, both kinds of stresses depending on the working pressure and on the width of the space 2, but being so small that the said walls may be built up of separate rings which can be made cheaper and more accurately and which require merely a light connection in the vertical sense. These rings are made with mutually overlapping flanges and are made tight at the joints with cement and rubber covered strips. A further method of connecting these rings together consists in providing the vertical walls with internal flanges 40 (Fig. 4) which are fastened together tightly by means of bolts 43, and interposed annular disks 41, and rubber packings 42.

When it is desired that the platform 5 shall not rise beyond a determined level, special valves (Fig. 4) are provided at a corresponding level. These have conical plugs 44, which are held against their seats by means of eccentric rods 45, acted upon by springs. So long as the valves remain inside the press cylinder, they will be pressed against their seats by the rolling collar I. If the piston 4 rises higher, the valves 44 are opened by the internal pressure in opposition to the action of the springs 46 (which may be of the spiral or of the leaf type). For the sake of clearness the figures do not show any devices for protecting the collars against damage by mechanical means, nor any guidings for movable parts. As the space 2 is wide, such guiding parts are indispensable.

Hydraulic and pneumatic motors constructed in accordance with this invention must be provided with the usual devices for distributing the motive fluid.

This invention has numerous applications besides those stated hereinbefore. It is applicable for instance to apparatus for observing the behavior of liquids and gases under high constant or varying pressures, to compressors for use with guns for storing the energy of recoil in shooting etc.

This system is suitable for working with ordinary towns' water service and will produce considerable pressure from this source alone. Its cheapness will enable it to be adopted by every village blacksmith and small agriculturist. It will satisfy all the requirements of every business, and will provide ample pressure for every forging press however powerful.

I claim—

1. In a hydraulic or pneumatic machine the combination with a cylinder, of a piston freely slidable in said cylinder, a plurality of superposed rolling packing tubings in the interspace between said cylinder and said piston, and means for distributing hydraulic pressure successively in the chambers formed by said packing tubings, said cylinder and said piston.

2. In a hydraulic or pneumatic machine the combination with a cylinder, of a piston freely slidable in said cylinder, a plurality of superposed rolling packing tubings in the interspace between said cylinder and said piston, means for distributing hydraulic pressure successively in the chambers formed by said packing tubings, said cylinders and said pistons, and means in co-action with the first named means for regulating the pressures in said chambers.

3. In a hydraulic or pneumatic machine the combination with a cylinder, of a piston freely slidable in said cylinder, a plurality of superposed rolling packing tubings in the interspace between said cylinder and said piston, and adjustable means for distributing hydraulic pressure successively in the chambers formed by said packing tubings, said cylinder and said piston.

4. In a hydraulic or pneumatic machine the combination with a cylinder, of a piston freely slidable within said cylinder, a plurality of superposed rolling packing tubings in the interspaces between said cylinder and said piston, means for distributing hydraulic pressure successively in the chambers formed by said packing tubings, said cylinder and said piston, and adjustable means in coaction with said first named means for regulating the pressures in said chambers.

5. In a hydraulic or pneumatic machine the combination, with a cylinder, of a piston comprising a plurality of superposed portions, rolling packing tubings between each of said portions and said cylinder and means for distributing hydraulic pressure successively in the interspaces between said superposed portions and said cylinders.

6. In a hydraulic or pneumatic machine the combination with a cylinder, of a piston comprising a plurality of superposed portions, rolling packing tubings between each of said portions and said cylinder, means for distributing hydraulic pressure successively in the interspaces between said portions and said cylinder and means for regulating the pressure therein.

7. In a hydraulic or pneumatic machine the combination, with a cylinder, of a piston comprising a plurality of superposed portions, rolling packing tubes between each of said portions and said cylinder means for distributing hydraulic pressure successively in the interspaces between said portions and said cylinder said means being adapted to be actuated, when the pressure in one interspace exceeds a certain limit.

8. In a hydraulic or pneumatic machine the combination, with a cylinder, of a piston comprising a plurality of superposed portions, rolling packing tubes between each of said portions and said cylinder, a plurality of superposed casings, each of said casings being provided with a valve and being connected with an interspace between one of said portions and said cylinder, resilient members within said casings, each of said members being adapted to admit fluid into the respective casing, when the pressure in the casing below exceeds a certain limit.

9. In a hydraulic or pneumatic machine the combination with a cylinder, of a piston slidable in said cylinder and comprising a plurality of superposed portions, rolling packing tubes between each of said portions and said cylinder, a plurality of superposed casings, each of said casings being provided with a valve and being connected with an interspace between one of said portions and said cylinder and being adapted to be opened when the pressure in the respective subjacent casing exceeds a certain limit, a second plurality of superposed casings, each of said casings being connected with one of the first named casings and being adapted to transmit fluid into the respective subjacent casing, when the pressure in the respective first named casing exceeds a certain limit.

In testimony whereof I affix my signature in presence of two witnesses.

PIERRE BRANDT.

Witnesses:
H. A. LOVIAGHINE,
M. SKRZYPKOWSKI.